(12) United States Patent
Lin et al.

(10) Patent No.: US 9,359,206 B2
(45) Date of Patent: Jun. 7, 2016

(54) METHOD FOR MAKING CARBON NANOTUBE COMPOSITE WIRE

(71) Applicants: Tsinghua University, Beijing (CN); HON HAI PRECISION INDUSTRY CO., LTD., New Taipei (TW)

(72) Inventors: Xiao-Yang Lin, Beijing (CN); Hao-Ming Wei, Beijing (CN); Peng Liu, Beijing (CN); Li-Na Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/500,467

(22) Filed: Sep. 29, 2014

(65) Prior Publication Data
US 2015/0360947 A1 Dec. 17, 2015

(30) Foreign Application Priority Data
Jun. 17, 2014 (CN) .......................... 2014 1 0269207

(51) Int. Cl.
*B01D 1/26* (2006.01)
*C01B 31/02* (2006.01)

(52) U.S. Cl.
CPC ......... *C01B 31/0226* (2013.01); *C01B 31/0253* (2013.01)

(58) Field of Classification Search
CPC ....... B01D 1/26; B01D 2203/30; C01B 31/02
USPC .................. 264/129, 164, 171.13; 427/434.2, 427/434.6, 434.7, 443.2
See application file for complete search history.

(56) References Cited

U.S. PATENT DOCUMENTS

2011/0020563 A1* 1/2011 Jiang et al. .................... 427/554

FOREIGN PATENT DOCUMENTS

| CN | 103413689 A | * | 11/2013 |
| KR | 2013054734 A | * | 5/2013 |
| KR | 20130100467 A | * | 9/2013 |

* cited by examiner

*Primary Examiner* — Leo B Tentoni
(74) *Attorney, Agent, or Firm* — Novak Druce Connolly Bove + Quigg LLP

(57) ABSTRACT

A method for making carbon nanotube composite wire includes providing a carbon nanotube array. A carbon nanotube film is drawn from the carbon nanotube array using a tool. The carbon nanotube film is treated using a graphene solution to obtain a carbon nanotube composite wire.

20 Claims, 2 Drawing Sheets

METHOD FOR MAKING CARBON NANOTUBE COMPOSITE WIRE

CROSS-REFERENCE TO RELATED APPLICATIONS

This application claims all benefits accruing under 35 U.S.C. §119 from China Patent Application No. 201410269207.9, filed on Jun. 17, 2014, in the China Intellectual Property Office. This application is related to commonly-assigned application entitled, "METHOD FOR MAKING CARBON NANOTUBE COMPOSITE WIRE", concurrently filed on Sep. 16, 2014, with application Ser. No. 14/487,990. Disclosures of the above-identified applications are incorporated herein by reference.

FIELD

The present application relates to a method for making a carbon nanotube composite wire.

BACKGROUND

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures such as carbon nanotube wires has attracted attention.

A carbon nanotube wire having a macro-scale carbon nanotube structure is directly drawn from a carbon nanotube array on a substrate. The carbon nanotube wire includes a plurality of successive carbon nanotubes substantially oriented along a same direction. The carbon nanotubes are joined end to end by van der Waals attractive force therebetween.

However, the carbon nanotubes are only joined by the van der Waals attractive force therebetween, thus a mechanical strength of the carbon nanotube wire needs to be improved.

What is needed, therefore, is to provide a method for making a carbon nanotube composite wire that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
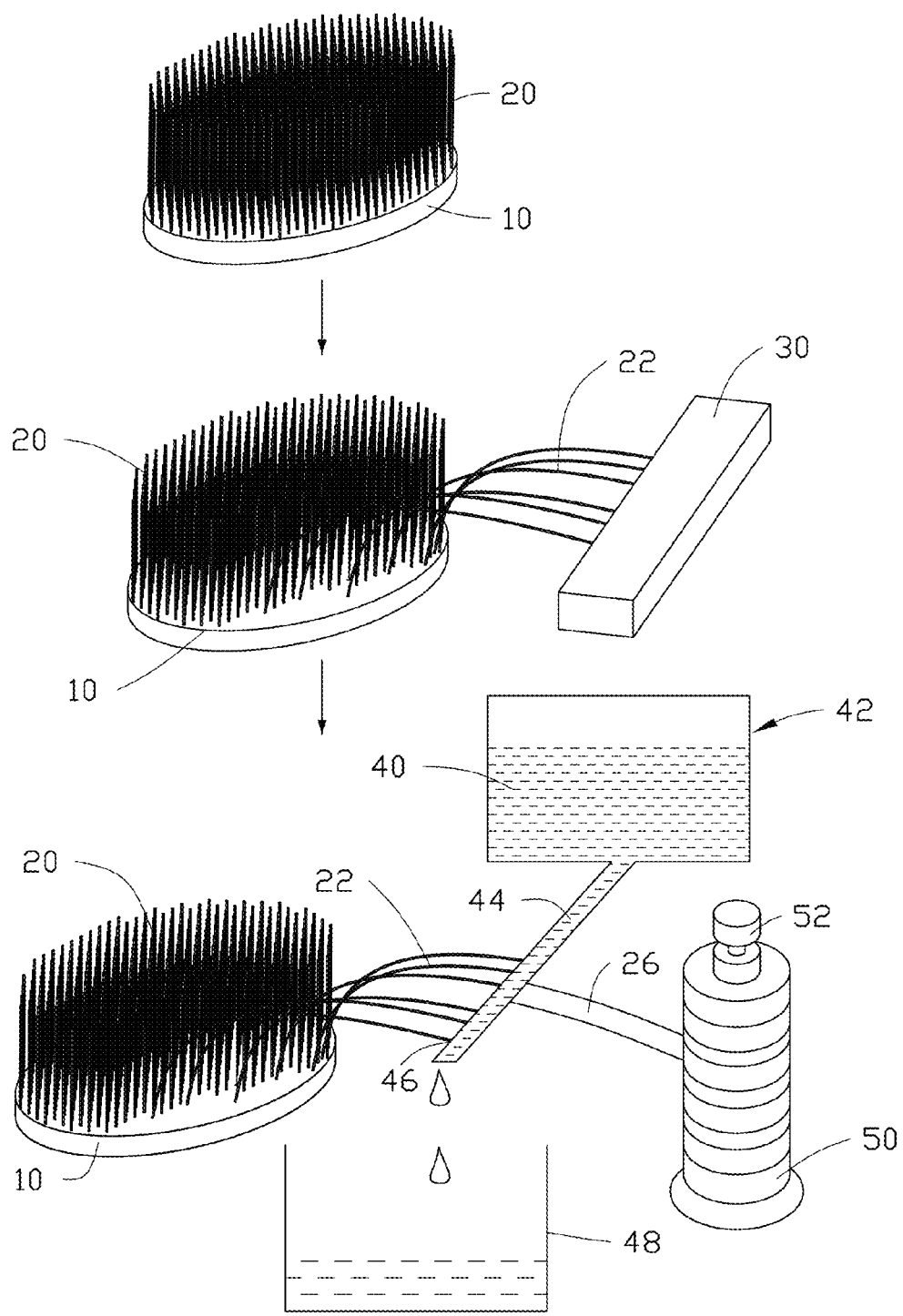
FIG. 1 is a schematic process view of one embodiment of a method for making a carbon nanotube composite wire.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, a method for making a carbon nanotube composite wire of one embodiment includes the following steps:

(S10), providing a carbon nanotube array 20;

(S11), forming a carbon nanotube film 22 by pulling from the carbon nanotube array 20 using a tool; and (S12), treating the carbon nanotube film 22 using a dispersed solution 40 to obtain a carbon nanotube composite wire.

In the step (S10), the carbon nanotube array 20 is fabricated by a chemical vapor deposition process in one embodiment. The chemical vapor deposition process includes the substeps of:

(S101), providing a substantially flat and smooth substrate 10, wherein the substrate 10 can be a P-type silicon substrate, an N-type silicon substrate, or a silicon substrate having oxide layer disposed thereon. In one embodiment, the substrate 10 is a P-type silicon substrate having a width of about 4 inches;

(S102), forming a catalyst on the surface of the substrate 10, wherein the catalyst can be made of iron, cobalt, nickel, or any combination alloy thereof;

(S103), annealing the substrate 10 with the catalyst at a temperature ranging from about 700° C. to about 900° C. in air for about 30 minutes to about 90 minutes;

(S104), heating the substrate 10 with the catalyst at a temperature ranging from about 500° C. to about 740° C. in a furnace with a protective gas therein; and (S105), supplying a carbon source gas to the furnace for about 5 minutes to about 30 minutes and growing the carbon nanotube array 20 on the substrate 10, wherein the carbon source gas may be hydrocarbon gas, such as ethylene, methane, acetylene, ethane, or any combination thereof.

The carbon nanotube array 20 includes a plurality of carbon nanotubes parallel to each other. The plurality of carbon nanotubes is substantially perpendicular to a top surface of the substrate 10 and a top surface of the carbon nanotube array 20. Moreover, the carbon nanotube array 20 formed under the above conditions is essentially free of impurities such as carbonaceous or residual catalyst particles.

In the step (S11), the carbon nanotube film 22 can be pulled/drawn by the following substeps:

(S111), selecting multiple carbon nanotubes by using the tool 30; and (S112), pulling the carbon nanotubes at an even/uniform speed to obtain a uniform carbon nanotube film 22.

In the step (S111), the tool 30 can be an adhesive tape, plier, tweezer, or another tool allowing multiple carbon nanotubes to be gripped and pulled simultaneously.

In the step (S112), a pulling direction is arbitrary. In one embodiment, the pulling direction is substantially perpendicular to a growing direction of the carbon nanotube array 20.

During the pulling process, as the initial carbon nanotubes are drawn out, other carbon nanotubes are also drawn out end-to-end due to the van der Waals attractive force between ends of adjacent carbon nanotube. This process of drawing ensures that a continuous, uniform carbon nanotube film 22 having a predetermined width can be formed.

Figure 2:
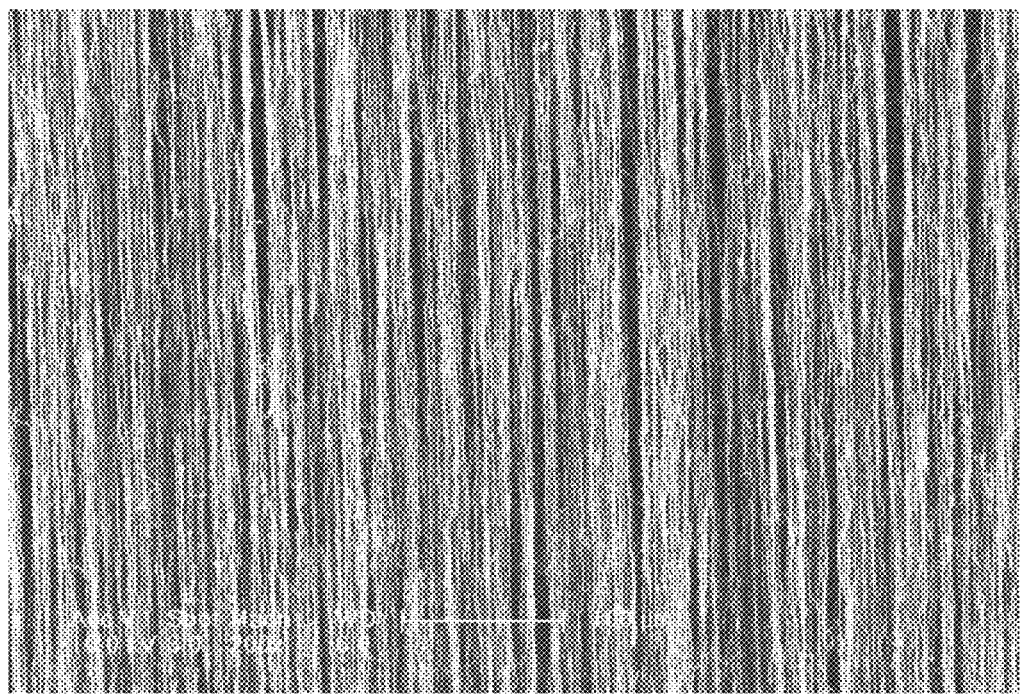
FIG. 2 is a scanning electron microscope (SEM) image of a carbon nanotube film.

Referring to FIG. 2, the carbon nanotube film 22 includes a plurality of carbon nanotubes joined end-to-end. The plurality of carbon nanotubes are parallel to the top surface of carbon nanotube film 22, and the carbon nanotube film 22 produced in such manner can be selectively formed to have a predetermined width. The plurality of carbon nanotubes in the carbon nanotube film 22 are joined end-to-end by van der Waals attractive force therebetween to form a free-standing film. The term 'free-standing' includes films that do not have to be supported by a substrate. In the carbon nanotube film 22, the adjacent two carbon nanotubes side by side may be in contact with each other or spaced apart from each other. Pores are defined in the carbon nanotube film 22 by adjacent carbon nanotubes.

When the carbon nanotube film 22 is formed and treated by the graphene solution or the graphene oxide solution, the carbon nanotube film 22 is suspended. The carbon nanotube film 22 has a first end and a second end opposite to the first end, the first end of the carbon nanotube film 22 is connected to the carbon nanotube array 20, and the second end of the carbon nanotube film 22 is held by the tool 30. The tool 30 can be fixed on a rotating machine to pull and rotate simultaneously, wherein rotating the rotating machine collects the carbon nanotube composite wire 26.

In the step (S12), the dispersed solution 40 can be a graphene solution or a graphene oxide solution.

The graphene solution can be obtained by dispersing an amount of graphene sheets into an organic solvent. In the present embodiment, the method for making the graphene solution therein includes:

(S121) providing an amount of graphene sheets;

(S122) disposing the graphene sheets in the organic solvent to form a mixture; and (S123) ultrasonically agitating the mixture to uniformly disperse and/or suspend the graphene sheets in the organic solvent, thereby obtaining the graphene solution.

In one embodiment, the mixture is ultrasonically agitated for about 15 minutes. It is to be understood that, other methods can be used to disperse the graphene sheets in the organic solvent. For example, the mixture can be stirred mechanically.

The organic solvent in the graphene solution should be able to allow dispersion of the graphene sheets and be able to evaporating totally. Ingredients of the organic solvent can have a small molecular weight. In one embodiment, the organic solvent can be ethanol, methanol, acetone, dichloroethane, chloroform, or combinations thereof. It is to be understood that, the organic solvent only acts as a medium wherein the graphene sheets are dispersed, and thus, the organic solvent should not react with the graphene sheets. The graphene sheets should not have a chemical reaction with the organic solvent, or be dissolved in the organic solvent.

The graphene sheet can be a single layer of graphene or multi-layers of graphene. In one embodiment, the graphene sheet includes 50 to 100 layers of graphene, improving a mechanical strength of the carbon nanotube composite wire 26. The graphene is a one-atom-thick planar sheet of $sp^2$-bonded carbon atoms that are densely packed in a honeycomb crystal lattice. A size of the graphene sheet can be in a range from about 100 nanometers to about 1 micron. A concentration of the graphene sheets in the graphene solution can be in a range from about 20% (volume percentage) to about 80%. In one embodiment, the concentration of the graphene sheets in the graphene solution is about 60%.

The graphene solution can be obtained by shear-mixing of graphite both in N-methyl-2-pyrrolidone (NMP) solution and in aqueous surfactant solutions (sodium cholate, NaC). The N-methyl-2-pyrrolidone (NMP) solution can be formed by mixing the N-methyl-2-pyrrolidone (NMP) into the organic solvent.

The graphene oxide solution is formed by dispersing graphene oxide with powder shape into an organic solvent. The organic solvent can be ethanol, methanol, acetone, dichloroethane, chloroform, or combinations thereof. A concentration of the graphene oxide in the graphene oxide solution can be in a range from about 15% (volume percentage) to about 70%. In one embodiment, the organic solvent is ethanol, the concentration of the graphene oxide in the graphene oxide solution is 2 mg/ml.

Referring to FIG. 1, a first container 42 is located on upside of the carbon nanotube film 22. The first container 42 fills with the dispersed solution 40. The first container 42 includes a tunnel 44 having a through hole 46 on its sidewall. When the carbon nanotube film 22 is passed through the through hole 46, the carbon nanotube film 22 can be wetted by the dispersed solution 40 from the tunnel 44. A second container 48 located on downside of the through hole 46 is used to hold the remained dispersed solution 40 from carbon nanotube film 22.

It is to be understood that, the dispersed solution 40 can be applied to the carbon nanotube film 22 to soak the carbon nanotube film 22.

The entire carbon nanotube film 22 is soaked by the dispersed solution 40. After being soaked by the dispersed solution 40 and volatilizing the organic solvent of the dispersed solution 40, the carbon nanotube film 22 is shrunk into a carbon nanotube wire, due to the action of the surface tension of the organic solvent of the dispersed solution 40. At the same time, the graphene sheets or the graphene oxide sheets are uniformly dispersed into the carbon nanotube wire, to obtain a carbon nanotube composite wire 26.

A surfactant can be dispersed into the dispersed solution 40. The surfactant can improve dispersion of the graphene sheets or the graphene oxide sheets in the carbon nanotube composite wire 26. The surfactant can form a chemical bond between the graphene sheets or the graphene oxide sheets and the carbon nanotubes joined end to end. The chemical bond can be similar to a hydrogen bond. Action force of the hydrogen bond is greater than action force of the van der Waals attractive force, improving the mechanical strength of the carbon nanotube composite wire 26. The surfactant can be selected according to need, such as octadecanoic acid, lecithin, or fatty glyceride.

After passing through the through hole 46, the carbon nanotube film 22 can be dried by irradiating using an infrared lamp. An irradiating time of the infrared lamp is related to the concentration of the graphene sheets in the graphene solution or the concentration of the graphene oxide sheets in the graphene oxide solution. In some embodiments, when the concentration of the graphene sheets in the graphene solution or the concentration of the graphene oxide sheets in the graphene oxide solution is in a range from about 20%-40%, the irradiating time is in a range from about 15 seconds to about 10 minutes. In some embodiments, when the concentration of the graphene sheets in the graphene solution or the concentration of the graphene oxide sheets in the graphene oxide solution is in a range from about 50%-80%, the irradiating time is in a range from about 30 seconds to about 20 minutes.

The carbon nanotube composite wire 26 can be collected. In some embodiments, after starting a machine motor 52, the carbon nanotube composite wire 26 is rolled to an axle 50.

It is to be understood that, multiple carbon nanotube films 22 can be formed by pulling from multiple carbon nanotube arrays 20. The multiple carbon nanotube films 22 can be simultaneously treated with grapheme solution or grapheme oxide solution, to obtain multiple carbon nanotube composite wires 26.

It is to be understood that, the carbon nanotube film 22 can be formed by pulling from the carbon nanotube array 20, while the carbon nanotube film 22 is treated by the dispersed solution to form the carbon nanotube composite wire 26, and at the same time the carbon nanotube composite wire 26 is rolled to the axle 50. Therefore, the carbon nanotube composite wire 26 can achieve continuous production.

The carbon nanotube composite wire 26 can include a plurality of carbon nanotubes and a plurality of graphene sheets or graphene oxide sheets. The plurality of carbon nanotubes is joined end to end by van der Waals attractive force therebetween. The plurality of carbon nanotubes is parallel to an axis of the carbon nanotube composite wire 26. The plurality of graphene sheets or graphene oxide sheets is dispersed in the carbon nanotube composite wire 26. The plurality of graphene oxide sheets includes C=O bond and C—O—H bond, improving the mechanical strength and stability of the carbon nanotube composite wire 26. When weight ratio between the plurality of carbon nanotubes and the plurality of graphene sheets or graphene oxide sheets is in a range from about 1:1 to about 10:1, the carbon nanotube composite wire 26 has good mechanical strength and light weight.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for making carbon nanotube composite wire comprising:
    providing a carbon nanotube array;
    drawing a carbon nanotube film from the carbon nanotube array using a tool, wherein the carbon nanotube film comprises a first end and a second end opposite to the first end; and
    treating the carbon nanotube film using a graphene solution; wherein in the step of treating the carbon nanotube film using the graphene solution, the first end is connected to the carbon nanotube array, and the second end is held by the tool.

2. The method of claim 1, wherein the carbon nanotube array comprises a plurality of carbon nanotubes substantially perpendicular to a top surface of the carbon nanotube array.

3. The method of claim 1, wherein the carbon nanotube film comprises a plurality of carbon nanotubes substantially parallel to a surface of the carbon nanotube film.

4. The method of claim 1, further comprising disposing a plurality of graphene sheets in an organic solvent to form the graphene solution.

5. The method of claim 4, wherein the plurality of graphene sheets comprises 50 to 100 layers of graphene.

6. The method of claim 4, wherein the organic solvent is ethanol, methanol, acetone, dichloroethane, chloroform, or combinations thereof.

7. The method of claim 4, wherein a concentration of the plurality of graphene sheets in the graphene solution is in a range from about 20% to about 80%.

8. The method of claim 1, wherein during the forming and treating the carbon nanotube film, the carbon nanotube film is suspended.

9. The method of claim 1, further comprising dispersing a surfactant into the graphene solution.

10. The method of claim 1, wherein the carbon nanotube film is shrunk into the carbon nanotube composite wire, comprising a plurality of carbon nanotubes and a plurality of graphene sheets, due to an action of a surface tension of an organic solvent of the graphene solution, wherein the plurality of graphene sheets are uniformly dispersed into the carbon nanotube composite wire.

11. The method of claim 10, wherein a chemical bond is formed between the plurality of graphene sheets and adjacent carbon nanotubes joined end to end.

12. A method for making carbon nanotube composite wire comprising:
    providing a carbon nanotube array;
    drawing a carbon nanotube film from the carbon nanotube array using a tool, wherein the carbon nanotube film comprises a first end and a second end opposite to the first end; and
    treating the carbon nanotube film using a graphene oxide solution; wherein in the step of treating the carbon nanotube film using the graphene oxide solution, the first end is connected to the carbon nanotube array, and the second end is held by the tool.

13. The method of claim 12, further comprising disposing a graphene oxide in an organic solvent to form the graphene oxide solution.

14. The method of claim 13, wherein the organic solvent is ethanol, methanol, acetone, dichloroethane, chloroform, or combinations thereof.

15. The method of claim 13, wherein a concentration of the graphene oxide in the graphene oxide solution is in a range from about 15% to about 70%.

16. The method of claim 12, wherein during the forming and treating the carbon nanotube film, the carbon nanotube film is suspended.

17. The method of claim 12, further comprising dispersing a surfactant into the graphene oxide solution.

18. The method of claim 17, wherein the surfactant is an octadecanoic acid, lecithin, or fatty glyceride.

19. A method for making carbon nanotube composite wire comprising:
    drawing a carbon nanotube film from a carbon nanotube array using a tool, wherein the carbon nanotube film comprises a first end and a second end opposite to the first end; and treating the carbon nanotube film using a dispersed solution; wherein in the step of treating the carbon nanotube film using the dispersed solution, the first end is connected to a carbon nanotube array, and the second end is held by the tool.

20. The method of claim 19, further comprising dispersing a surfactant into the dispersed solution.

\* \* \* \* \*